United States Patent [19]
Bogovican et al.

[11] Patent Number: 5,281,779
[45] Date of Patent: Jan. 25, 1994

[54] MULTI-FUNCTION MODULAR SWITCH

[75] Inventors: Dragan Bogovican, Sterling Heights; Anthony Vultaggio, Warren, both of Mich.

[73] Assignee: United Technologies Automotive, Inc., Dearborn, Mich.

[21] Appl. No.: 874,154

[22] Filed: Apr. 27, 1992

[51] Int. Cl.⁵ .............................................. H01H 9/00
[52] U.S. Cl. ..................................... 200/5 R; 200/18
[58] Field of Search .......... 200/4, 5 R, 11 TW, 16 C, 200/16 D, 61.27, 61.54, 18; 338/172, 198, 200, 215

[56] References Cited
U.S. PATENT DOCUMENTS

| | | | |
|---|---|---|---|
| 4,129,757 | 12/1978 | Cryer | 200/4 |
| 4,164,633 | 8/1979 | Sheridan et al. | 200/4 |
| 4,379,954 | 4/1983 | Iwata et al. | 200/4 |
| 4,613,733 | 9/1986 | Migrin et al. | 200/5 R |
| 4,810,839 | 3/1989 | Chretien | 200/4 |

Primary Examiner—J. R. Scott

[57] ABSTRACT

An electrical switch contains three contactor carriers, each capable of containing a different pattern of contactors. The carriers slide on conductive strips to complete circuits to electrical devices. Two carriers are controlled by a linkage that moves one as the linkage is pushed or pulled and moves the other as the linkage is rotated. The third carrier is moved by thumbwheel and engages a resistance element that is connected to the strips, to vary the resistance through a pair of strips. A removable cover has walls that force the carriers towards the strips and limit the movement of some carriers. A bayonet lamp engages the strips to light the faceplate under the control of the third carrier.

15 Claims, 5 Drawing Sheets

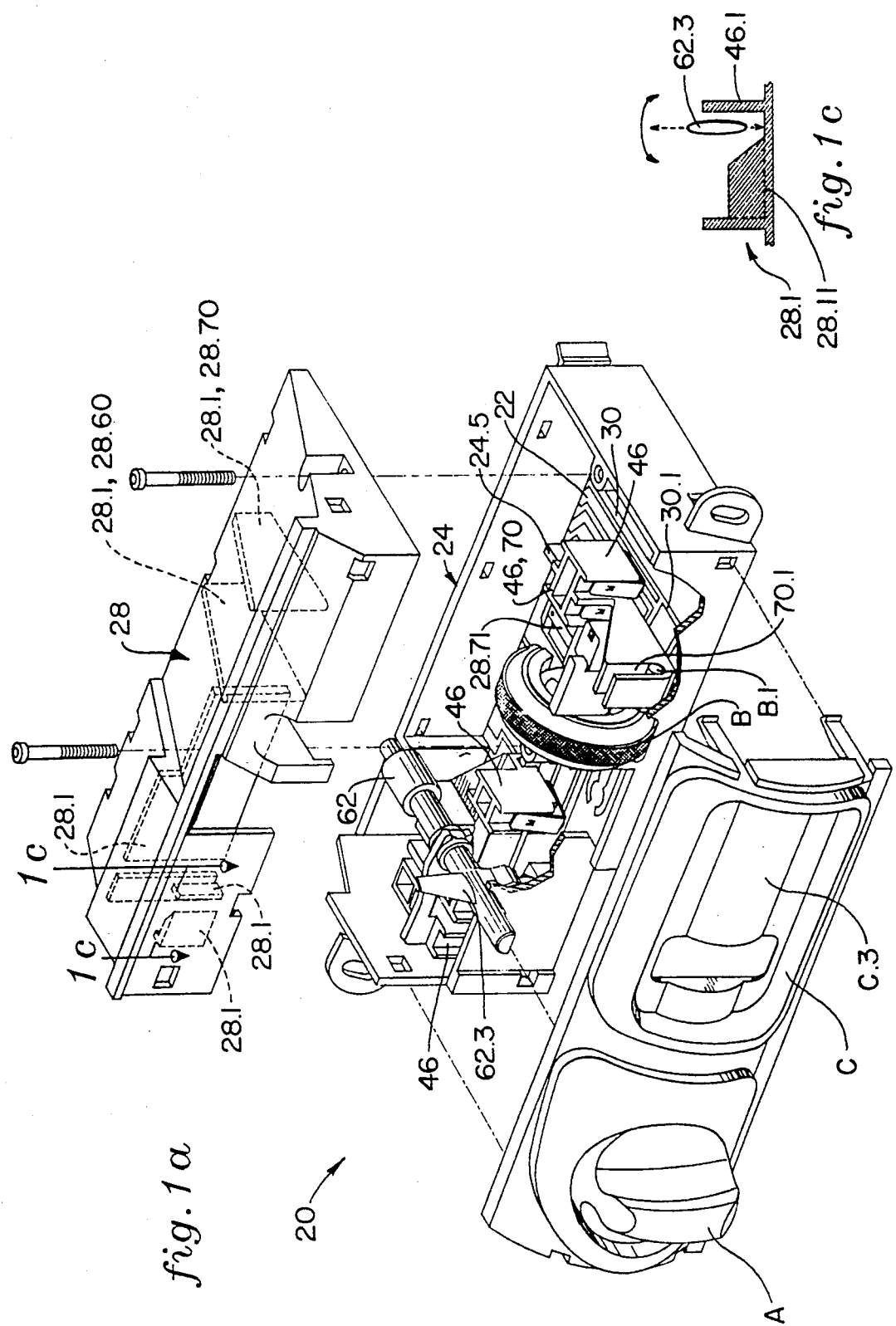

MULTI-FUNCTION MODULAR SWITCH

TECHNICAL FIELD

This invention relates to switches, in particular, multi-function headlight switches and dimmers for automobiles.

BACKGROUND OF THE INVENTION

In recent years, automobile lighting systems have become more and more complex as a variety of lighting options have been made available by manufacturers. For example, there are headlights that automatically dim and turn off, and more and more cars have fog lights. For light on/off switches, usually mounted somewhere in the automobile dashboard, are operated independently of the headlight switch in most vehicles. The headlight switch, on the other hand, may be mounted on the dashboard or, as is often the case in many cars, on an arm on the steering wheel column. Switches that control instrument dimming are commonly part of the headlight switch.

To deal with multiplicity of switch operations that may be required to control headlights, foglights and dimming, manufacturers often install a "universal" headlight switch. This is a switch that contains all the possible separate switches that may be needed. The separate switches may be "ganged" or arranged in banks. Some or all of the switches are used in a particular application depending on how many lighting options are used. A universal lighting switch can be an expensive way to accommodate different options. Some manufacturers, on the other hand, provide separate headlight switches and a "customized switch" for each particular combination of options. Different option combinations therefore calls for the installation of different headlight switches. Customized switches avoid the expense of the all option or universal switch, but there may be little or no net savings considering the inventory of customized switches that a manufacturer may have to carry.

DISCLOSURE OF THE INVENTION

An object of the present invention is providing a unitary switch that can control a plurality of electrical devices in different applications.

An object of the present invention is providing a headlight switch system is truly "universal" in that it can be configured for different simply by adding or removing resuable, interchangeable and inexpensive parts.

According to the invention, a unitary switch system has a plurality of switch contactor carriers. Each contactor carrier slides along the surface of having conductive strips (linear contacts) connected to electrical devices. Each device is controlled by connecting strips to establish an electric circuit. Strips are connected by moving the carrier to a selected location at which a contactor on the carrier connects the strips. The number of strips is dicated by the maximum possible number of devices to be controlled by the carrier (i.e. the number of connections that have to be opened and closed). Contacts may be added to the carrier to connect more strips and vice versa. The carrier is moved in a linear direction across the surface of the board by a linkage. The extent of this movement is limited, based on the strips connected by the contactors on the carrier.

According to the invention, the carrier and board are contained in a two-piece case. One piece is base, which supports the strips and contains terminals on an outside wall to connect the strips to the device. One aspect of the invention is that the strips are molded into the base of the case. The second piece of the case is a lid that contains "carrier guides", which, when the lid is placed on the base, these guides securely press the carriers (and the contactors on them) against the strips.

According to the invention, a linkage moves one carrier in a first direction to connect a first set of steps and a second carrier in a second direction, transverse to the first direction, to connect a second set of strips without changing the connection to the first strip.

According to the invention, this linkage is pulled to effect carrier motion in the first direction and rotated, through detents, to effect carrier motion in the second direction. The linkage is connected to the first carrier by a "lost motion" connection. The detents are part of flange on the linkage that stops the linkage from being over extended.

According to the invention, the linkage rotates within an arm that connects with the second carrier, allowing the linkage to rotate without moving the second carrier. According to one aspect of the invention, an interlock is provided on the switch cover so that when the linkage is rotated it is simultaneously retracted or extended, to move both carriers and provide a selected electrical connection, e.g. that fog lights are only on with head lights.

According to the invention, a third contact carrier also slides on the strips. This carrier contains contacts to connect strips, but also contains a wiper which connects some strips through a linear resistance element that is inlaid on the board. As this third carrier is moved, by a linkage, it establishes electrical connection between strips through the resistor strip. As it continues to move, the amount of resistance in the circuit changes, e.g. to turn on and dim a dome light. Contacts may be added to the carrier to connect more strips. The contacts on both carriers are the same. One aspect of the invention is that the linkage is a thumbwheel with a crank pin to move the third carrier back and forth to connect the strips and vary the resistance.

According to the present invention, each carrier has receptacles to receive a standard snap-fit contact and a spring that holds the contact against the board (e.g. the strips).

According to the invention, faceplate snaps on to the base and the thumbwheel rotates on an axis on the base and partially extends through the faceplate. The other linkage extends through the wall and the faceplate to knob for rotating and extending and retracting the linkage.

Among the features of the present invention is its "modularity" and interchangeability of its parts. A multi-pin plug may be pressed onto the edge of the board to connect the switch to the electrical devices. The same board is used for a multitude of applications. The parts that are needed to modify the switch to control more or less devices are few in number and inexpensive, reducing inventory costs significantly.

Other objects, aspects, benefits and features of the invention will be apparent to one skilled in the art from the following discussion.

BRIEF DESCRIPTION OF THE DRAWINGS

FIG. 1a is a perspective view of the multi-function electrical switch with the housing cove and front face exploded.

FIG. 1c is a section taken along line 1c—1c of FIG. 1a, showing one of the ribs in the cover that provides an interlock for a linkage connect to a pair of carriers.

FIG. 3a is a top plan the carrier in FIG. 3a.

BEST MODE FOR CARRYING OUT THE INVENTION

Figure 1B:
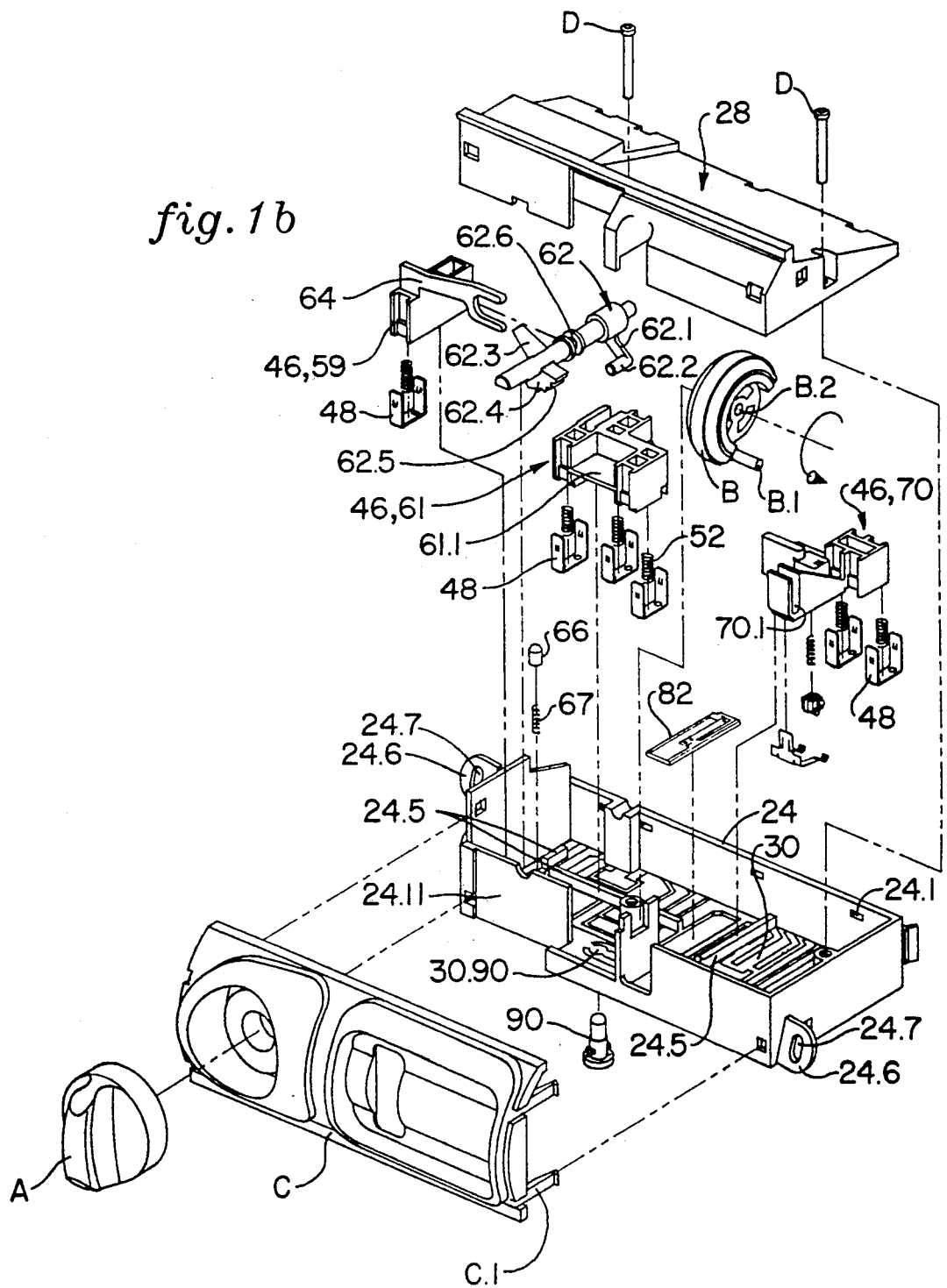
FIG. 1b is an exploded perspective view of the multi-function electrical switch with the carriers and associated linkages also exploded.
Figure 2:
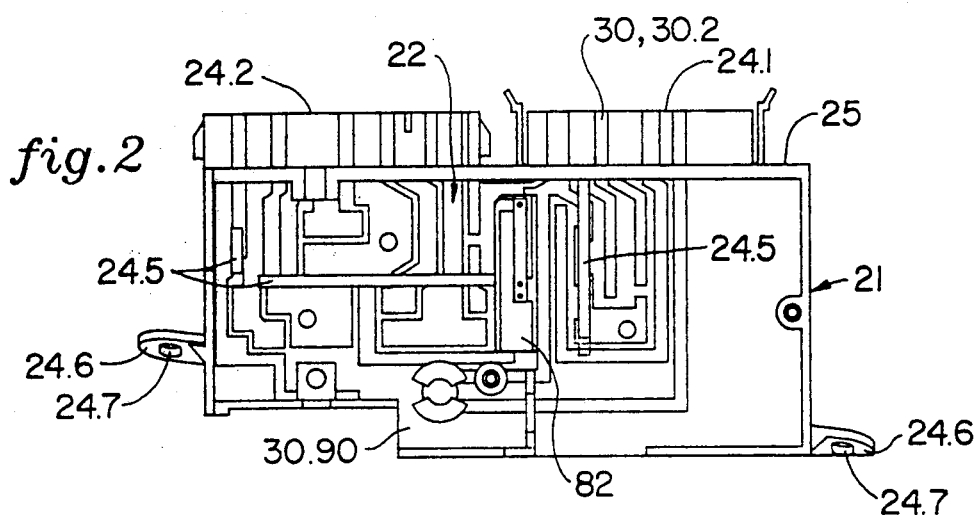
FIG. 2 is a top plan view showing the housing and conductive strips inside the housing.
Figure 7:
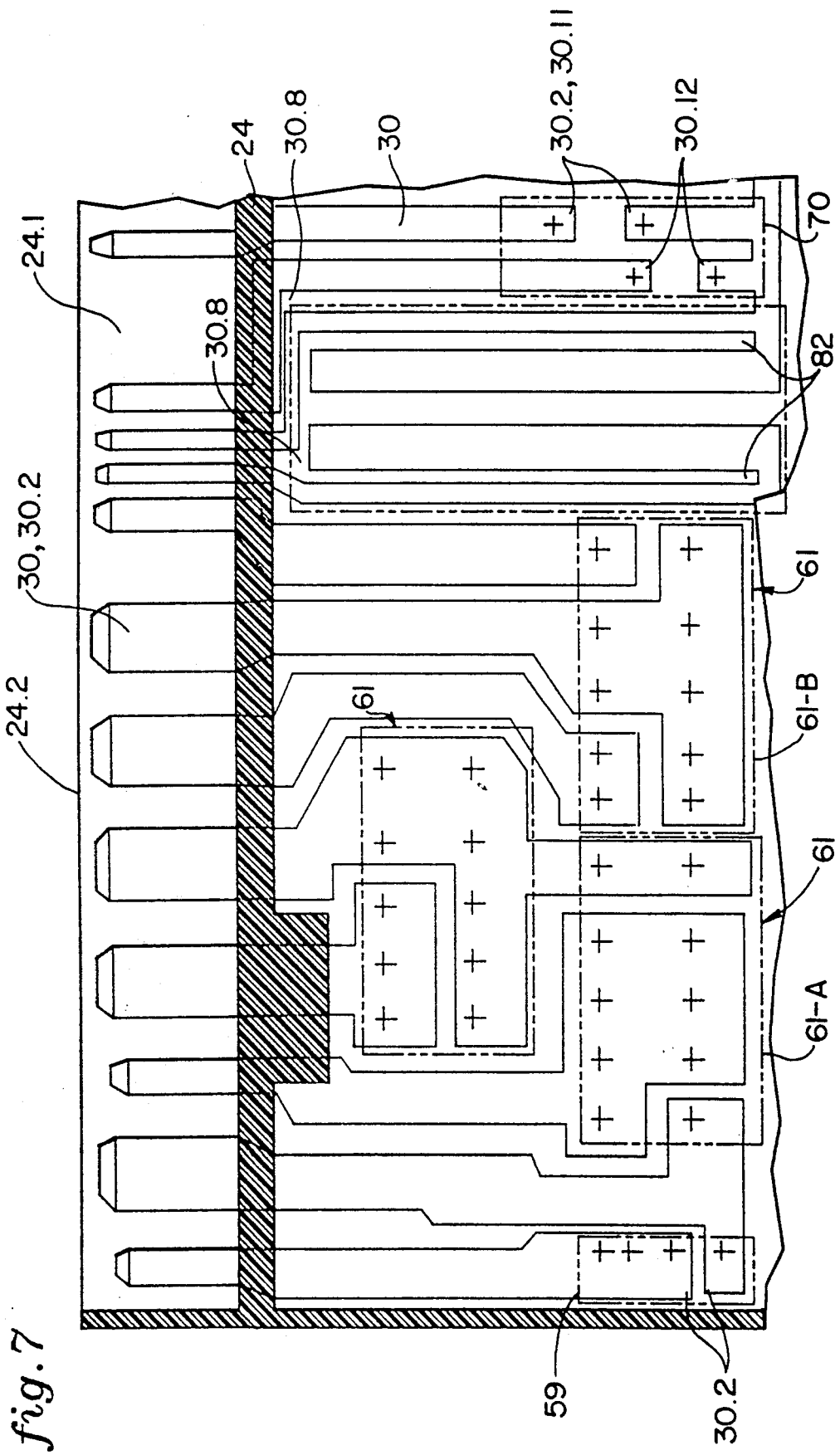
FIG. 7 is a top plan view of the strips showing.

Referring to FIGS. 1a, 1b and 7, a multi-function modular electrical switch 20 includes a base 22 integral walls 24 and a removable cover 28. A flat circuit consisting of conductive strips or circuit traces 30 is integrally mounted within the housing 21 on a plastic base 24.1, preferably molded, so that sections 30.2 of some of the strips 30.1 can extend through the integral wall 24, creating a an external but integral (with the wall) terminal board 24.2 for a press-on multi-pin plug (not shown) that connects the strips to associated electrical devices, such as headlamps, lamp dimmers and lamp levelers. As described below, pairs of these strips, e.g. strips 30.2, are connected by operating control surfaces (knob A and thumbwheel B to provide and in some cases vary the power to those devices, the strips 30 in effect being flat contacts in series with the power circuit for the devices.

Figure 3:
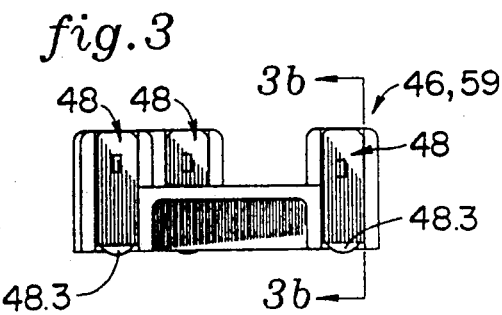
FIG. 3 is a front elevation of one carrier.
Figure 3A:
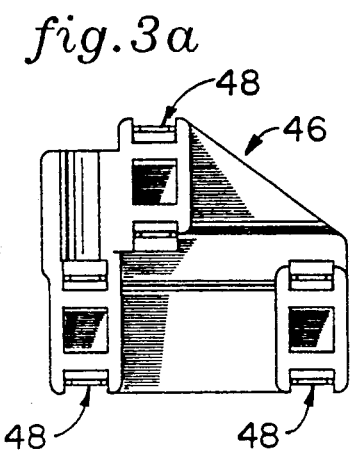
Figure 3B:
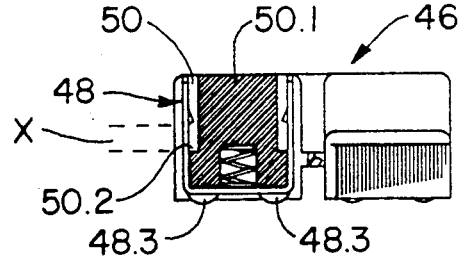
FIG. 3b is a sectional view taken along the line 3b—3b of FIG. 3, showing, in section, a contact in its associated receptacle.
Figure 4:
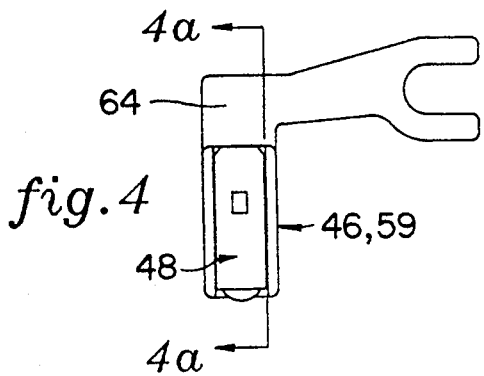
FIG. 4 is a front view of another carrier.
Figure 4A:
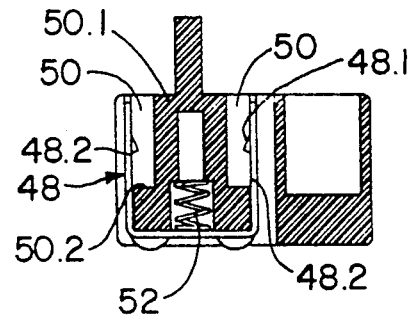
FIG. 4a is a sectional view taken along the line 4a—4a of FIG. 4, also showing the contactor and its receptacle.
Figure 5:
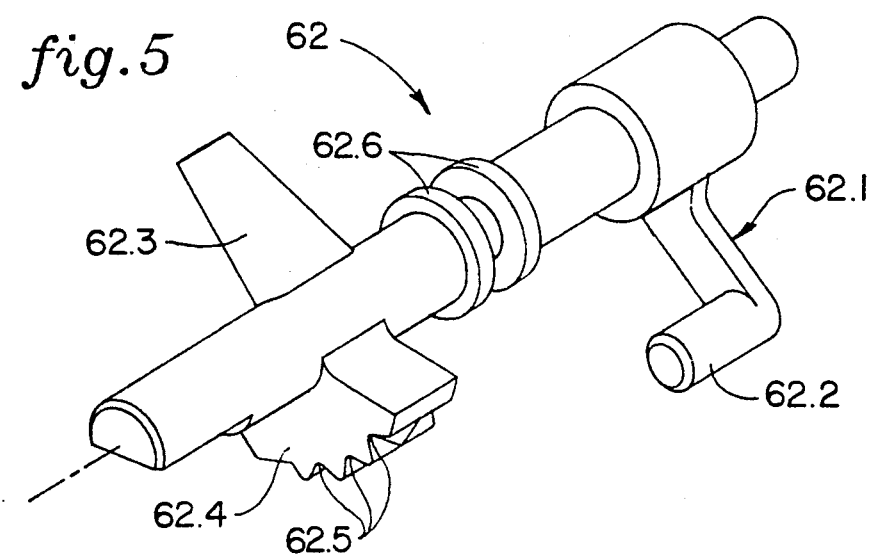
FIG. 5 is an isometric view of a dual action control shaft used in the switch.
Figure 6:
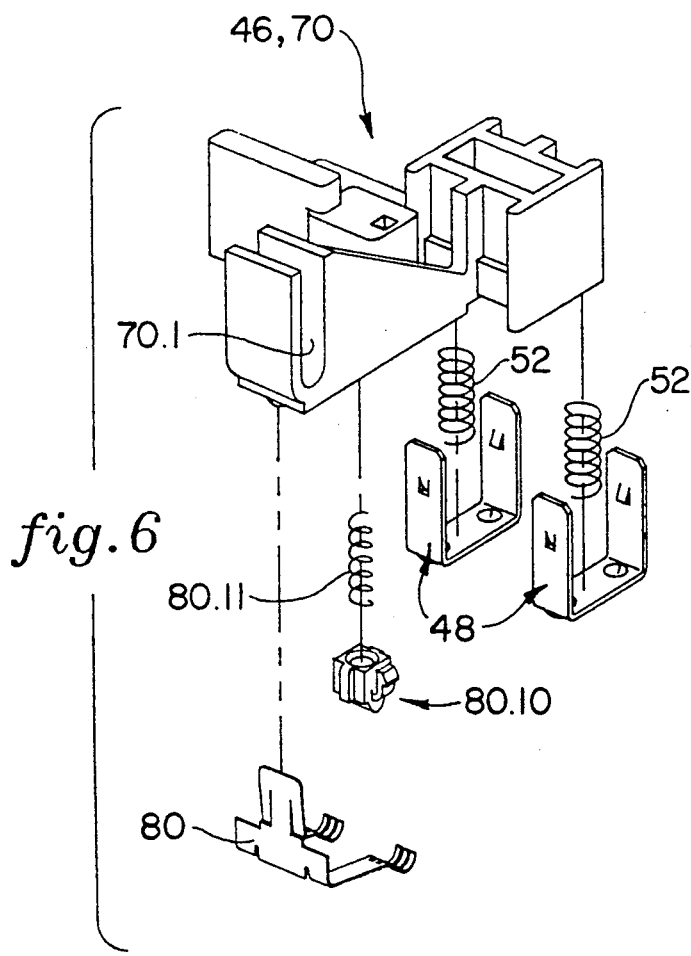
FIG. 6 is an exploded view of a another carrier, showing the contacts thereon and a resistance element brush displaced from their respective locations on the carrier.

The switch contains three "contactor" carriers 46, each including a plurality of contactors 48 engaging (sliding on) the strips 30. From FIGS. 3b and 4a in particular, it can be seen that each contactor 48 is a U-shaped piece of conductive material long enough to connect two strips. Each contactor rests in a receptacle on the carrier formed from two slots 50 defining a receptacle base 50.1 between them. Each slot has a cut or notch 50.2 to receive a tang on each vertical surfaces of the contactor, to hold the contactor in an extended or biased position from the base under the force of an expansion spring 52, located between the receptacle base and the contactor base, that base contacting the strips. As a consequence of the "resilient positioning" of the contactors on the carriers, a carrier can "held against the strips", with the springs (or an equivalent resilient member) forcing the contactor down with an acceptable force. Each contactor has two contactor bearing points 48.3 that engage the strips. As described in more detail below, the cover 28, when attached, has internal ribs 28.1 that force each carrier 46 down against the strips well as limiting the range of horizontal motion of some of the carriers.

FIGS. 1a and 1b, show that a first of the contactor carriers 46, carrier 59, and a second, carrier 61, are actuated by a push-pull/rotary control shaft 62. An arm 62.1 on the shaft has a pin 62.2 that rests in a slot 61.1 in the carrier 61, the combination of which defines a "lost motion" connection, allowing the shaft to be pushed or pulled without moving the first carrier. However, rotating the shaft causes the arm 62.1 to rotate, moving the first carrier sideways. A second arm 64 on the shaft is connected to the carrier 59 and moves the second carrier when the shaft 62 is pushed or pulled. But the shaft can rotate within this arm at race 62.6, which captures the arm 64 for the described push-pull movement. Rotating the shaft 62 therefore does not change the position of the carrier 59. FIG. 1c further shows a specific rib 28.11 that engages arm 62.3 acting as an interlock preventing the rotation of rod 62 when it is extended or pulled outward, moving the carrier 59. The profile of rib (surface) 28.11 is tappered from a flat surface, as shown, so that, the arm 62.3, and thereby the shaft 62, is retracted (upward in FIG. 1c, following the dotted arrow) if the arm is rotated CW when the rod is initially pulled out fully from the cover 28. Conversely, where the rod is pushed in, it can be rotated, but cannot be extended, as the arm 62.3 would engage the flat surface portion of the rib 28.11. This function is useful in preventing certain lights controlled by carrier 59 (e.g. fog lights) from operating without other lights (e.g. parking or headlamps) controlled by carrier 6.1. By removing the area 28.11, the interlock is deleted. This can be easily done by replacing the lid, which can include a suitable different place of ribs 28 to allow the carriers to make different connections (move more or less).

The control shaft 62 further comprises a radially, outwardly extending collar 62.4 with a plurality detent notches 62.5, defining rotational positions for the first carrier. These engage a detent pin 66 that is biased against the notches by a spring 67 held in a suitable seat 67.2 on the wall 24.9 wall. Each of those possible positions for the carrier 61, connects more or less strips—depending on the strip configuration and the location of the contactors on the carrier—to control different electrical devices or connect different external circuits to a device. A stop arm 62.3 engages the seat 67.2, preventing the rod 62 from complete rotation. In FIG. 7, positions 61-A and 61-B are representative of two possible sideways positions for the carrier 61. There it should also be seen that carrier 59 has two possible positions for connecting or disconnecting strips 30.2.

FIG. 1a shows that inside the cover 28 are molded-in walls 28.1 or ribs that extend downward towards the strips. These walls perform two functions. First, they press on the top of the carriers, forcing the contactors against the strips, as explained previously. Second they limit movement of the carriers by engaging extending into the path of movement of the shaft. Alternatively, they could extend into the path of one carrier while forcing the other carrier downward. When a carrier is placed on the strips during assembly, the springs 52 force them up to a first position (height above the strips) best defined by the distance X in FIG. 3b, the distance between the notch 50.2 and the tang 48.1. By dimensioning the walls so that they extend slightly below the top of the carriers when they are at this "elevated position" when the cover is in place, a single wall can force a carrier down and also create a stop for another carrier. In this manner, different circuit connections can be made by installing a cover with different rib locations.

The switch also includes a third carrier 70 controlled by a combination control that causes it to move and also vary a resistance to control current through some strips connected by the carriers. This would be useful to turn on dash lights and control their illumination. A thumbwheel B is rotationally attached to the housing by a pivot shaft B.2 and has a crank pin B.1 that engages a vertical slot 70.1 in the third carrier, so that the carrier can be moved back and force by rotating the thumbwheel. In addition to the contactors, the carrier 70 contains a brush set 80 that brushes along a linear resistance element 82 installed on the base. The brush connects a strip pair 30.9 through the resistance and that resistance varies as the third carrier moves. The brush ends are forced against the strips by a plastic tab 80.10 under the force a spring 80.11. At the same time, the contactors on the carrier 70 also complete the connection between strips 30.11 and 30.12, depending on the position of the carrier. The carrier 70 is also forced down on the strips by the rib 28.70 in the cover, as shown by line 28.71, like carrier 61, which is forced down by rib 28.60.

A bayonet lamp socket 90 snaps into the bottom of the switch, making electrical contact with strips 30.90, which provide variable power to the lamp through the movement of the carrier 70. The lamp back-illuminates the faceplate.

A faceplate C snaps on to the front of the switch by means of the flange 24.6, on the wall of the case, and snap fittings C.1, which that are integral with the face plate and snap into a corresponding holes 24.7, in the flange. The knob A is attached to the rod and the thumbwheel B, which is pivotally mounted to the wall 24.11 as mentioned before on an axis, extends through the face place. Space is provided at C.3 for more thumbwheels to control additional carriers 70 if needed for a particular application.

Using the foregoing description and explanation, one skilled in the art may be able to make modifications and variations to the described embodiments of the invention with departing from its true scope and spirit.

We claim:

1. An electric switch, characterized by:
    a plurality of unconnected conductive strips on a board;
    terminals for connecting an electrical device to a pair of said strips;
    a first contactor;
    a first contactor carrier that has a receptacle for holding said first contactor and that can be moved in a first direction from a first position to a second position to electrically connect a first pair of said strips through said first contactor, said carrier having a plurality of said receptacles at different locations for holding additional contactors to connect additional pairs of said strips at a selected position along said first direction;
    a second contactor carrier moveable in a second direction, transverse to said first direction, to a third position;
    first means for moving said first contactor carrier in said first direction and said second carrier in said second direction, said first means being rotatable to move one of the carriers and extendable to rotate a second of the carriers;
    means on said board for guiding said first carrier in said first direction and said second contactor carrier in said second direction;
    a second contactor in a receptacle on said second carrier to electrically connect a pair of said strips at said third position;
    means on said board for guiding said second carrier in said second direction;
    said first means for moving said first carrier in said first direction without moving said second carrier and for moving said second carrier in said second direction without moving said first carrier.

2. A switch as described in claim 1, characterized by, a printed circuit linear resistance element mounted on said board;
    a third contactor carrier that slides on said board between two positions and contains a plurality of receptacles, each for receiving a contactor to connect a pairs of said strips as said second carrier moves;
    second means for moving said third carrier between said positions;
    a brush mounted on said third carrier and brushing on said element to vary the current through a pair of said strips;
    means for guiding said third carrier in said third direction.

3. A switch according to claims 1 or 2 characterized by each carrier having a plurality of said receptacles at different locations for holding additional interchangeable contactors to connect additional pairs of said strips.

4. A switch as described in claim 1, characterized in that said first means for moving said means for moving said first contactor comprises a rotatable rod with a cam that extends radially into an elongated seat in said first contactor means, said being normal to the axis of said rod and a bearing collar for receiving a radial arm connected to said second carrier, said arm being rotatably mounted in said collar.

5. A switch as described in claim 3 characterized in that said second means comprises a thumbwheel; a cam on said thumbwheel that engages a vertical channel on said second carrier, and an axle supported on a vertical wall on said base, said thumbwheel partially extending through said wall.

6. A switch as described in claims 1 or 2 characterized in that said case has a removable cover and stop means, on said cover, for pushing carriers against the strips and limiting carrier movement when the cover is attached to the case.

7. A switch as described in claim 6, characterized by said stop means comprising vertical ribs extending downward to said board to a first vertical position above the board that is less than a second vertical position defined by the height of the top of a carrier when said cover is removed.

8. A switch as described in claim 7, characterized by a vertical rib on said cover that engages said first means to cause it to move in said second direction when moved in said first direction.

9. A switch as described in claim 8, characterized in that said strips are molded into a base on the case that includes a molded wall, said strips extending through said wall on an integral external edge on said wall, and said wall includes integral walls around said external edge that define a slot to receive a plug.

10. A switch as described in claim 1, characterized in that each receptacle comprises a pair of vertical slots with a notch and a carrier portion base between said slots; said contactor has a horizontal base with two vertical sections, each located in one of said vertical slots and containing a tang that engages said notch to hold the contactor in place; and an expansion spring is located between said carrier base portion between the vertical slots to bias the contactor towards said board.

11. A switch as described in claim 1, characterized by: a faceplace that snaps onto a wall on said board and a knob that is located in a seat in the faceplate, said knob being attached to said first means, said first means extending through said wall.

12. A switch as described in claim 11, characterized by: a thumbwheel; a cam on said thumbwheel that engages a vertical channel on said second carrier, and an axle supported on a vertical wall of said base, said thumbwheel partially extending through said wall and said faceplate.

13. A switch as described in claim 2, characterized by a removable bayonet lamp that engages a pair of said strips for receiving power varied by the movement of said third carrier for providing to illuminate a faceplate associated with the switch.

14. A switch for controlling a plurality of electrical devices characterized by:
a single dual direction control on a wall; a plurality of strips on a board fixed to said wall, said strips connected to the electrical devices; two contactor carriers connected to said control and moveable between elected positions on said board for connecting pairs of said strips, said control being rotatable on said wall for moving a first carrier in a first direction to connect a first pair of strips and extendable through said wall for moving a second carrier in a second direction to connect a second pair of strips without moving said first carrier; a switch cover; and walls on said cover that force said carriers towards said board.

15. A switch according to claim 14 characterized by a tapered surface on the wall to retract the control from a first extended position as the control is rotated to a first rotated position and a flat surface on the wall to prevent the control from being extended to said first extended position when the control is at said first rotated position.

* * * * *